US010068030B2

(12) United States Patent
Coulthard et al.

(10) Patent No.: US 10,068,030 B2
(45) Date of Patent: Sep. 4, 2018

(54) EXTENDING JAVA SERVER FACES WEB PAGES TO SUPPORT MULTIPLE DEVICES

(75) Inventors: Phil Coulthard, Aurora (CA); Brian G. Farn, Toronto (CA)

(73) Assignee: International Business Machines Corporation, Armonk, NY (US)

(*) Notice: Subject to any disclaimer, the term of this patent is extended or adjusted under 35 U.S.C. 154(b) by 942 days.

(21) Appl. No.: 11/056,587

(22) Filed: Feb. 11, 2005

(65) Prior Publication Data
US 2006/0184913 A1 Aug. 17, 2006

(51) Int. Cl.
*G06F 17/30* (2006.01)
(52) U.S. Cl.
CPC .. *G06F 17/30905* (2013.01); *G06F 17/30014* (2013.01); *G06F 17/3092* (2013.01)
(58) Field of Classification Search
CPC ......... G06F 17/30905; G06F 17/30014; G06F 17/3092
USPC .................................. 717/100, 114; 707/811
See application file for complete search history.

(56) References Cited

U.S. PATENT DOCUMENTS

| 5,999,179 | A  | * | 12/1999 | Kekic et al. .............. 715/734 |
| 7,246,134 | B1 | * | 7/2007  | Kitain et al. .......... 707/999.102 |
| 7,412,689 | B1 | * | 8/2008  | Quinn et al. .............. 717/107 |
| 7,634,721 | B1 | * | 12/2009 | Labrecque ................ 715/234 |
| 2002/0180791 | A1 | * | 12/2002 | Broussard ................ 345/763 |
| 2003/0182651 | A1 |   | 9/2003  | Sacrist et al. |
| 2004/0003347 | A1 |   | 1/2004  | Saidenberg et al. |
| 2004/0078371 | A1 |   | 4/2004  | Worrell et al. |
| 2005/0144226 | A1 | * | 6/2005  | Purewal ................... 709/203 |
| 2005/0289156 | A1 | * | 12/2005 | Maryka et al. ............ 707/100 |
| 2006/0168536 | A1 | * | 7/2006  | Portmann ................ 715/762 |

OTHER PUBLICATIONS

Bill Dudney, Jonathan Lehr, Bill Willis, LeRoy Mattingly, Mastering JavaServer Faces, Jun. 2004, Wiley, Chaper 2; pp. 47-83.*
Daivd Geary, A First Look at JavaServer Faces, Part 2, Dec. 27, 2002, JavaWorld.com pp. 1-19.*
Thomas Ziegert, Markus Lauff, and Lutz Heuser, Device Indpendent Web Applciations—The Author Once-Display everywhere approach, 2004, Singer-Verlag Berlin Heidelberg, pp. 244-255.*
Nimisha Bajwa, Greg Boutain, Letisha Larson, Dragana Lojanica, Gretchen Stoltz, JAVA 2 Platform Enterprise Edition J2EE, Dec. 18, 2002.*
Prithpal S. Bhogill, An Introduction to Java Server Faces, Aug. 2003, Object Computing, Inc. , Java News Breif, p. 1-13.*
Sys-Con Media, JavaServerFaces A Standard-based solution for JavaWeb Applications, 2004, Java Developers Journal, p. 1-11.*
Budi Kurniawan & Jingling Xue, "A Comparative Study of Web Application Design Models Using the Java Technologies", 2004, Springer APWeb 2004, LNCS 3007, pp. 711-721.*

(Continued)

*Primary Examiner* — Scott A. Waldron
(74) *Attorney, Agent, or Firm* — Steven M. Greenberg, Esq.; CRGO Law

(57) ABSTRACT

The present invention provides a method, system, and computer program product for extending Java Server Faces Web pages to support multiple devices. The method includes: providing a device and modeling language independent Java Server Faces (JSF) web page, wherein the JSF web page does not contain any modeling language specific elements.

3 Claims, 2 Drawing Sheets

(56) References Cited

OTHER PUBLICATIONS

Llames, Leonardo, "WebSphere Development Studio for iSeries", International Business Machines Corporation, 57 pages. (Year: 2001).*
McClanahan, Craig, et al., "JavaServer Faces Specification: Version 1.1", Feb. 2004 (Maintenance Release May 27, 2004), Sun Microsystems, Inc., 301 pages. (Year: 2004).*
"The J2EE v1.4 Tutorial History" and "J2EE 1.4 Downloads" pages, retrieved from Internet Archive Wayback Machine on Mar. 8, 2018, captured on Apr. 5, 2004 and Feb. 11, 2004 respectively, 4 pages. (Year: 2004).*
Armstrong, Eric, et al., "The J2EE 1.4 Tutorial: for Sun Java System Application Server Platform Edition 8.2", Dec. 7, 2005, Sun Microsystems, Inc., 1542 pages. (Year: 2005).*

* cited by examiner

EXTENDING JAVA SERVER FACES WEB PAGES TO SUPPORT MULTIPLE DEVICES

BACKGROUND OF THE INVENTION

1. Field of the Invention

The present invention generally relates to web pages. More particularly, the present invention provides a method, system, and computer program product for extending Java Server Faces web pages to support multiple devices.

2. Related Art

Web page content is specified using a markup language. The web page content is streamed to a client device, such as a web browser or personal desktop assistant (PDA). The markup language that web browsers understand is HyperText Markup Language (HTML). Other device types may understand a markup language other than HTML. A web page may contain user interface components, such as entry fields, combo boxes, and text areas. For web browser pages, HTML elements are used to represent these types of user interface components.

Java Server Faces (JSF) is a servlet technology deployable to a web application server that allows programmers to manipulate a web application's web page content. A number of HTML elements of a web page are replaced by JSF tags, where each JSF tag represents a JSF user interface (UI) runtime component (hereafter referred to as "JSF component"). To this extent, using JSF, a web browser page comprises a mixture of HTML elements, such as page flow break tags, span tags, and comment tags, and JSF tags, such as input text tags. Background information regarding JSF is provided below. More detailed information regarding JSF can be found, for example, at http://java.sun.com/j2ee/1.4/docs/tutorial/doc/.

The JSF framework includes a plurality of JSF components, where each JSF component is represented on a web page by a JSF tag. Each JSF component is responsible for rendering a portion of the content of a web page. For instance, the JSF "dataTable" tag and its corresponding JSF UIData component renders TABLE, TR (table row), TD (table data) and TH (table header) elements into text on an HTML web page. Alternatively, each JSF component may delegate its rendering to a separate renderer that may be shared with other JSF components.

Render kits contain one or more renderers, where each render kit has the ability to render the markup language text required by a particular target device. The JSF reference implementation includes a render kit for HTML. Render kits may be added for other markup languages used by client types such as rich clients, or mobile devices.

A JSF tag library comprises one or more render kits, a set of JSF tags and a set of JSF components. There are currently two tag libraries defined in the latest Java Server Faces specification, including a JSF tag library for core Java Server Faces and a JSF tag library for HTML.

In theory, JSF has the potential to target multiple devices using markup language specific render kits, where each render kit allows either each JSF component, or delegate renderers, to render the markup language text for a specific target device. If the full potential of JSF were actually realized, use of JSF would provide the following advantages:

(A) A single set of JSF web pages can be rendered using more than one markup language and can therefore simultaneously support multiple device types;
(B) Web page designers can design web pages that are markup language independent, and device independent; and
(C) Web page design editors, also known as visual editors or visual builders, can aid in the design of device independent web forms, eliminating the need to have multiple device specific design editors.

Unfortunately, the current set of JSF tags is insufficient to realize this potential. Not enough of the underlying markup language and its associated function is represented by JSF tags in order to make a JSF web page device and markup language independent. Thus, there is a need for a method, system, and program product for providing JSF web pages comprising only markup language independent JSF tags. This would allow for the rendering of device dependent markup language text from device independent JSF web page content.

SUMMARY OF THE INVENTION

In general, the present invention provides a method, system, and computer program product for extending Java Server Faces (JSF) web pages to support multiple devices. The present invention provides a JSF web page including device and markup language independent JSF tags, where the JSF web page does not contain any markup language (e.g., HTML) specific elements. A set of JSF runtime components for making a JSF web page device and markup language independent are also provided. These include:

(A) A JSF component that represents a document's top level element, such as the <HTML> element in a HyperText Markup Language (HTML) web page;
(B) A JSF component that represents an area of a web page;
(C) JSF components that describe how widgets are arranged within an area of a JSF web page;
(D) A JSF component that represents a reference to an external function, or rendered script; and
(E) A JSF component that represents a reference to external information such as a style sheet.

Advantageously, implementations of the present invention, combined with implementations of more than one device dependent renderer, enable web applications to target multiple devices from a single set of device and markup language independent JSF web pages.

A first aspect of the present invention is directed to a method for providing a device and markup language independent JSF web page, wherein the JSF web page does not contain any markup language specific elements.

A second aspect of the present invention is directed to a system comprising means for providing a device and markup language independent JSF web page, wherein the JSF web page does not contain any markup language specific elements.

A third aspect of the present invention is directed to a program product stored on a recordable medium, which when executed comprises: program code for providing a device and markup language independent JSF web page, wherein the JSF web page does not contain any markup language specific elements.

A fourth aspect of the present invention is directed to a method for deploying an application, comprising: providing a computer infrastructure being operable to provide a device and markup language independent JSF web page, wherein the JSF web page does not contain any markup language specific elements.

A fifth aspect of the present invention is directed to computer software embodied in a propagated signal comprising instructions to cause a computer system to perform the following functions: provide a device and markup language independent JSF web page, wherein the JSF web page does not contain any markup language specific elements.

BRIEF DESCRIPTION OF THE DRAWINGS

These and other features of this invention will be more readily understood from the following detailed description of the various aspects of the invention taken in conjunction with the accompanying drawings in which.

Figure 1:
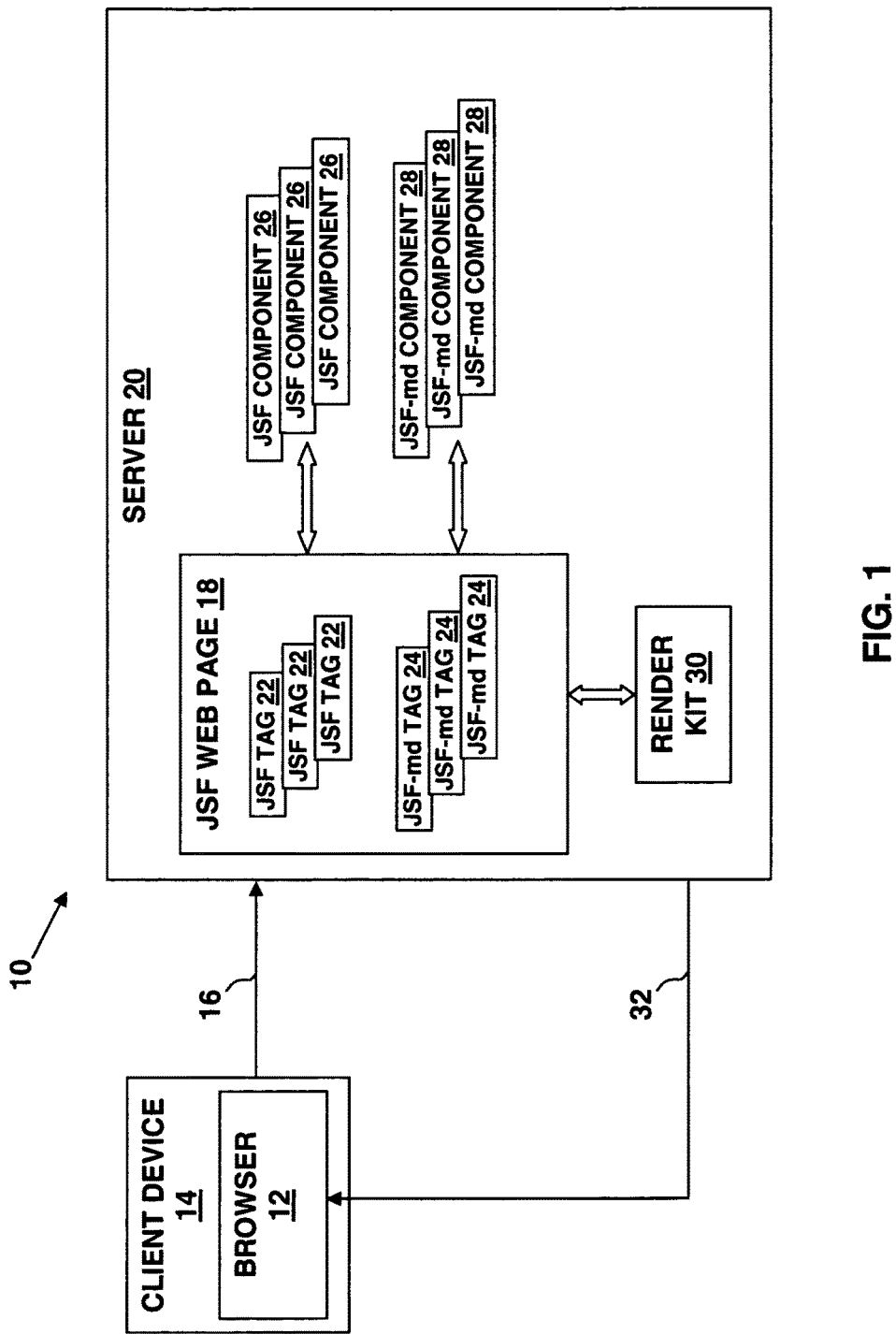
FIG. 1 depicts a system for extending Java Server Faces (JSF) web pages to support multiple devices in accordance with an embodiment of the present invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

As indicated above, the present invention provides a method, system, and computer program product for extending Java Server Faces (JSF) web pages to support multiple devices. The present invention provides a JSF web page including device and markup language independent JSF tags, where the JSF web page does not contain any markup language (e.g., HTML) specific elements. A set of JSF components for making a JSF web page device and markup language independent is also provided.

A system 10 for extending JSF web pages to support multiple devices in accordance with an embodiment of the present invention is illustrated in FIG. 1. As shown, a browser 12 running on a client device 14 sends a request 16 (e.g., a HyperText Transfer Protocol (HTTP) request) for a JSF web page 18 to a server 20. The JSF web page 18 in server 20 comprises a plurality of currently available JSF tags 22 and a plurality of new JSF multiple device (md) tags 24 provided in accordance with the present invention. Each of the currently available JSF tags 22 represents a corresponding currently available JSF component 26. Analogously, each of the new JSF-md tags 24 represents a corresponding new JSF-md component 28 provided in accordance with the present invention.

A render kit 30 is provided to render the JSF web page 18 in the markup language text required by the browser 12 running on the client device 14, using the JSF components 26 referenced by the JSF tags 22 and the JSF-md components 28 referenced by the JSF-md tags 24. Multiple render kits 30 can be provided to support different markup languages. The rendered web page is then sent by the server 20 to the browser 12 in a response 32 (e.g., a HTTP response).

In accordance with the present invention, the JSF web page 18 comprises JSF tags 22 and JSF-md tags 24, but does not contain any markup language (e.g., HTML) specific elements. This enables a web application to target multiple devices from a single set of device independent JSF web pages. The JSF-md tags 24, which complement the existing core set of JSF tags 22, represent the following JSF-md components 28:

(A) A JSF-md component 28 that represents a document's top level element (i.e., markup language);

(B) A JSF-md component 28 that represents an area of a JSF web page 18 (e.g., a rectangular container of other JSF components 26 and/or JSF-md components 28);

(C) JSF-md components 28 that describe how widgets/objects are arranged within an area of a JSF web page 18 (i.e., layout and layout data information);

(D) A JSF-md component 28 that represents a reference to an external function, or rendered script; and (E) A JSF-md component 28 that represents a reference to external information such as a style sheet that is stored externally to the JSF web page 18.

Examples of each type of JSF-md component 28 are presented below. It should be noted that the following examples are only illustrative of the concepts of the present invention, and are not intended to be limiting in any way.

Web Page Structure

As with all JSF web pages 18, the declarations of the JSF tag libraries are at the top of the page:

```
<%@taglib uri="http://java.sun.com/jsf/core" prefix="f"%>
<%@taglib uri="http://java.sun.com/jsf/html" prefix="h"%>
```

For the examples which follow, the JSF core tag library is represented with the prefix "f:" and the HTML tag library is represented with the prefix "h:". New JSF-md tags 24 provided by the present invention will be assumed to be in a new JSF-md tag library for JSF-md tags 24 called "md.tld," where the JSF-md tag library is represented by the prefix "a:".

```
<%@taglib uri="http://java.sun.com/jsf/core" prefix="f"%>
<%@taglib uri="http://java.sun.com/jsf/html" prefix="h"%>
<%@taglib uri="md.tld" prefix="a"%>
```

The JSF core view tag 22 follows after the JSF tag library declarations and encapsulates all other JSF and JSF-md tags 22, 24 on a JSF web page 18.

```
<%@taglib uri="http://java.sun.com/jsf/core" prefix="f"%>
<%@taglib uri="http://java.sun.com/jsf/html" prefix="h"%>
<%@taglib uri="md.tld" prefix="a"%> <f:view> </f:view>
```

Markup Language Tag

A new JSF-md markup language (ml) tag 24 and corresponding JSF-md ml component 28, allow a JSF renderer to render the top level Extensible Markup Language (XML) element for the target markup language. For instance, for Extensible Hypertext Markup Language (XHTML) documents, the JSF-md ml component 28 would render <xhtml> and </xhtml>. The JSF-md ml tag 24 must be the only child of the JSF core view tag 22.

```
<%@taglib uri="http://java.sun.com/jsf/core"    prefix="f"%>
<%@taglib uri="http://java.sun.com/jsf/html"    prefix="h"%>
<%@taglib uri="md.tld"                          prefix="a"%>
<f:view>
  <a:ml>
  </a:ml>
</f:view>
```

Panel

A panel is a JSF-md container component 28 that represents a two dimensional area with width and height that contains child JSF components 26. The following example shows a JSF-md panel tag 24 with child JSF selectonelistbox and outputtext tags 22.

```
<%@taglib uri="http://java.sun.com/jsf/core"   prefix="f"%>
<%@taglib uri="http://java.sun.com/jsf/html"   prefix="h"%>
<%@taglib uri="md.tld"                          prefix="a"%>
<f:view>
    <a:ml>
        <a:panel>
            <h:selectonelistbox id="list1">
                ...
            </h:selectonelistbox>
            <h:outputtext id="label1">
                ...
            </h:outputtext>
        </a:panel>
    </a:ml>
</f:view>
```

Events and Actions

There are two categories of events: events that are handled on the server 20; and events that are handled locally on the client device 14. Server-side event handling uses established JSF event handling mechanisms. When a client-side event occurs, a client side action is performed. The description of a client-side action is specific to each markup language, and is therefore rendered by a markup language specific renderer. Some renderers may render script logic using a scripting language such as JavaScript, while others may render XML formed instructions. A new JSF-md call tag 24 and corresponding JSF-md call component 28 encapsulate the concept of a call to a function. It is the responsibility of the JSF-md call component 28 to render the markup language specific instructions such as script, or as a command to execute a device specific function.

An example of a client-side action is "attribute to attribute linking," where a change in the value of one JSF component's attribute results in a change to the value of a different JSF component's attribute. In the following sample JSF code, when the value of a JSF "inputtext" component 26 is changed, a call is made to a function whose name is "attributelink." Parameters that the function call requires are specified with child JSF core param tags 22.

```
<%@taglib uri="http://java.sun.com/jsf/core" prefix="f"%>
<%@taglib uri="http://java.sun.com/jsf/html" prefix="h"%>
<%@taglib uri="md.tld"                        prefix="a"%>
<f:view>
    <a:ml>
        <h:selectonelistbox id="list1" onchange="function1">
            <a:call id="function1" name="attributelink">
                <f:param name="sourcename"       value="list1"  />
                <f:param name="sourceattribute"  value="value"  />
                <f:param name="targetname"       value="label1" />
                <f:param name="targetattribute"  value="value"  />
            </a:call>
        </h:selectonelistbox>
        <h:outputtext id="label1">
            ...
        </h:outputtext>
    </a:ml>
</f:view>
```

Layout

Layout information is used by containers, such as panels, to describe how a container is to lay out its children. Examples of layout types are:

(A) Grid layout where child JSF components 26 are arranged in a grid fashion, and have characteristics such as the number of columns, and the amount spacing between columns; and (B) Pixel layout where child JSF components 26 are positioned and sized using coordinates and dimensions measured in a number of pixels.

The following example illustrates a new JSF-md layout tag 24 which is a child of any JSF container tag, such as the JSF-md panel tag.

```
<%@taglib uri="http://java.sun.com/jsf/core" prefix="f"%>
<%@taglib uri="http://java.sun.com/jsf/html" prefix="h"%>
<%@taglib uri="md.tld"                        prefix="a"%>
<f:view>
    <a:ml>
        <a:panel>
            <a:layout type="grid">
                <f:param name="columns"  value="2" />
                <f:param name="marginX"  value="4" />
                <f:param name="marginY"  value="4" />
                <f:param name="spacingX" value="2" />
                <f:param name="spacingY" value="2" />
            </a:layout>
            <h:selectonelistbox id="list1" onchange="function1">
                <a:call id="function1" name="attributelink">
                    <f:param name="sourcename"       value="list1"  />
                    <f:param name="sourceattribute"  value="value"  />
                    <f:param name="targetname"       value="label1" />
                    <f:param name="targetattribute"  value="value"  />
                </a:call>
            </h:selectonelistbox>
            <h:outputtext id="label1">
                ...
            </h:outputtext>
        </a:panel>
    </a:ml>
</f:view>
```

Alternatively, a specific JSF-md layout tag 24 for each layout type may be used. For instance, a JSF-md gridlayout tag 24 may be used as follows:

```
<%@taglib uri="http://java.sun.com/jsf/core" prefix="f"%>
<%@taglib uri="http://java.sun.com/jsf/html" prefix="h"%>
<%@taglib uri="md.tld"                        prefix="a"%>
<f:view>
    <a:ml>
        <a:panel>
            <a:gridlayout columns="2" marginX="4" marginY="2"
                spacingX="2" spacingY="2" />
            <h:selectonelistbox id="list1" onchange="function1">
                <a:call id="function1" name="attributelink">
                    <f:param name="sourcename"       value="list1"  />
                    <f:param name="sourceattribute"  value="value"  />
                    <f:param name="targetname"       value="label1" />
                    <f:param name="targetattribute"  value="value"  />
                </a:call>
            </h:selectonelistbox>
            <h:outputtext id="label1">
                ...
            </h:outputtext>
        </a:panel>
    </a:ml>
</f:view>
```

Layout Data

Layout data is used by contained components to describe how the component is to be arranged within its parent container, such as horizontal alignment within a grid cell. As with layout, there are a number of layout data types such as:

(A) Grid layout data which specifies, for instance, how the component is to be horizontally and vertically aligned within the grid cell, and the number of horizontal and vertical grid cells to occupy; and
(B) Pixel layout data which specifies the horizontal and vertical position coordinates measured in pixels, and dimensions measured in pixels.

The following example illustrates a new JSF-md layout-data tag 24 that has a "type" attribute to specify the type of layout data. The layout data type of its parent JSF component 26 (in this example, selectonelistbox) needs to be compatible with the layout type of its parent's JSF container component (in this example, panel).

```
<%@taglib uri="http://java.sun.com/jsf/core" prefix="f"%>
<%@taglib uri="http://java.sun.com/jsf/html" prefix="h"%>
<%@taglib uri="md.tld"                       prefix="a"%>
<f:view>
  <a:ml>
    <a:panel>
      <a:layout type="grid">
        <f:param name="columns" value="2" />
        <f:param name="marginX" value="4" />
        <f:param name="marginY" value="4" />
        <f:param name="spacingX" value="2" />
        <f:param name="spacingY" value="2" />
      </a:layout>
      <h:selectonelistbox id="list1" onchange="function1">
        <a:layoutdata type="grid">
          <f:param name="alignmentX"    value="fill"    />
          <f:param name="alignmentY"    value="top"     />
          <f:param name="cellsX"        value="2"       />
          <f:param name="cellsY"        value="1"       />
          <f:param name="excessX"       value="true"    />
          <f:param name="excessY"       value="false"   />
        </a:layoutdata >
        <a:call id="function1" name="attributelink">
          <f:param name="sourcename"      value="list1"   />
          <f:param name="sourceattribute" value="value"   />
          <f:param name="targetname"      value="label1"  />
          <f:param name="targetattribute" value="value"   />
        </a:call>
      </h:selectonelistbox>
      <h:outputtext id="label1">
        ...
      </h:outputtext>
      ...
    </a:panel>
  </a:ml>
</f:view>
```

Alternatively, a specific JSF-md tag 24 for each layout data type may be used. For instance, a JSF-md gridlayout-data tag 24 may be used as follows:

```
<%@taglib uri="http://java.sun.com/jsf/core"  prefix="f"%>
<%@taglib uri="http://java.sun.com/jsf/html"  prefix="h"%>
<%@taglib uri="md.tld"                        prefix="a"%>
<f:view>
  <a:ml>
    <a:panel>
      <a:gridlayout columns="2" marginX="4" marginY="2"
         spacingX="2" spacingY="2" />
      <h:selectonelistbox id="list1" onchange="function1">
        <a:gridlayoutdata   alignmentX  = "fill"
                            alignmentY  = "top"
                            cellsX      = "2"
                            cellsY      = "1"
                            excessX     = "true"
                            excessY     = "false" />
        <a:call id="function1" name="attributelink">
          <f:param name="sourcename"      value="list1"   />
          <f:param name="sourceattribute" value="value"   />
          <f:param name="targetname"      value="label1"  />
          <f:param name="targetattribute" value="value"   />
        </a:call>
      </h:selectonelistbox>
      <h:outputtext id="label1">
        ...
      </h:outputtext>
      ...
    </a:panel>
  </a:ml>
</f:view>
```

Linking to External Information

A JSF web page 18 may be linked to other information, such as a style sheet, or to another web page. A new JSF-md link tag 24 and a corresponding JSF-md link component 28 encompass all of the features of the HTML "link" element. The HTML link element attribute names and their corresponding JSF-md link tag 24 attribute names are listed in TABLE 1.

TABLE 1

| HTML link" Element Attribute | JSF-md Link Tag attribute |
| --- | --- |
| charset | characterset |
| href | reference |
| hreflang | referencelanguage |
| media | media |
| rel | relation |
| rev | reverserelation |
| type | contenttype |

Each JSF-md link tag 24 attribute has the equivalent function as its HTML attribute.

In the following example, a JSF-md link tag 24 is used to reference an external style sheet named sheet1.css. The selectonelistbox JSF tag uses a style class that is defined in the style sheet.

```
<%@taglib uri="http://java.sun.com/jsf/core"  prefix="f"%>
<%@taglib uri="http://java.sun.com/jsf/html"  prefix="h"%>
<%@taglib uri="md.tld"                        prefix="a"%>
<f:view>
  <a:ml>
    <a:link relation="stylesheet" reference="sheet1.css"
       contenttype="text/css" media="all" />
    <a:panel>
      <a:gridlayout columns="2" marginX="4" marginY="2"
         spacingX="2" spacingY="2" />
      <h:selectonelistbox id="list1" onchange="function1"
         styleclass="listboxstyle">
        <a:gridlayoutdata alignmentX = "fill" alignmentY = "top"
       cellsX = "2" cellsY = "1" excessX = "true" excessY = "false" />
        <a:call id="function1" name="attributelink">
          <f:param name="sourcename"      value="list1"   />
          <f:param name="sourceattribute" value="value"   />
          <f:param name="targetname"      value="label1"  />
          <f:param name="targetattribute" value="value"   />
        </a:call>
      </h:selectonelistbox>
      <h:outputtext id="label1">
        ...
      </h:outputtext>
      ...
    </a:panel>
  </a:ml>
</f:view>
```

Figure 2:
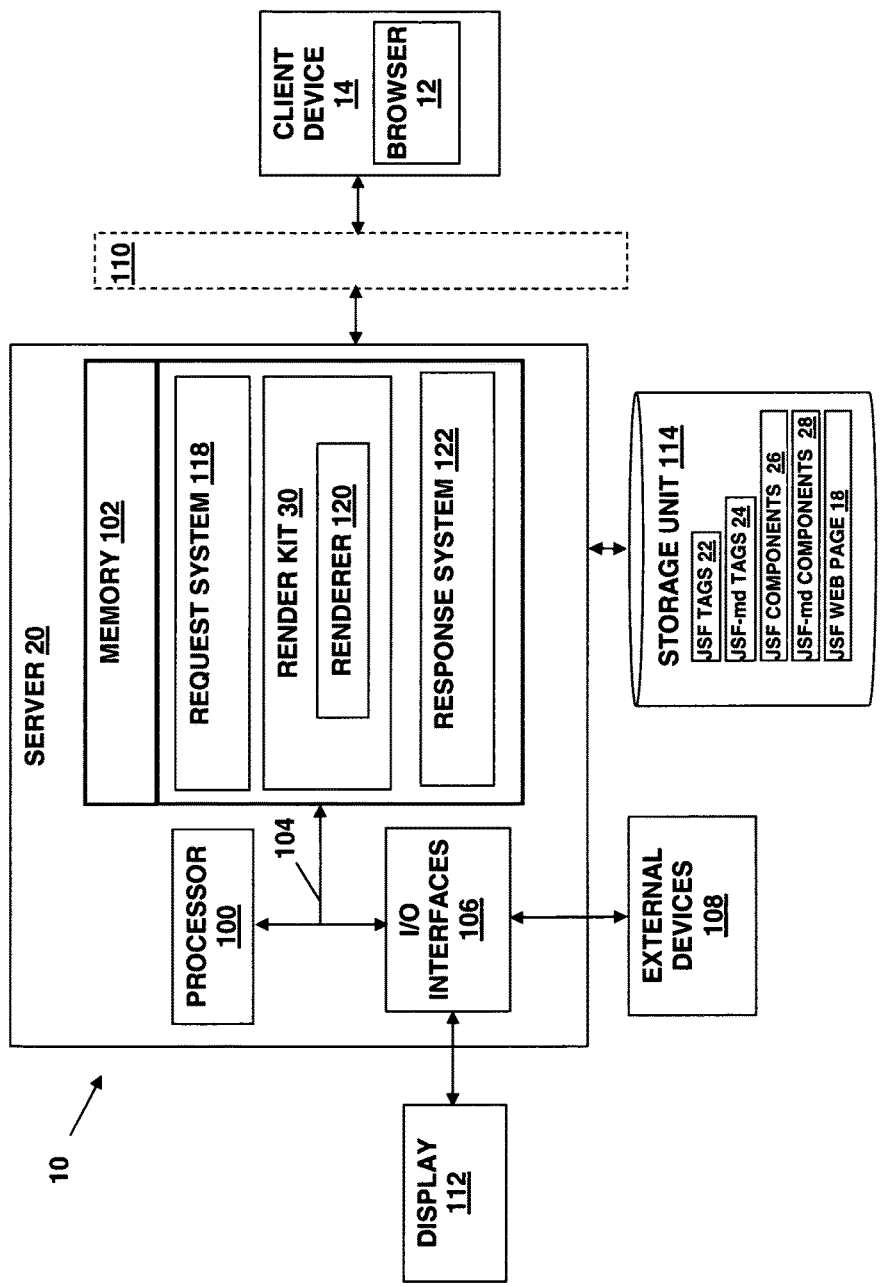
FIG. 2 depicts the system of FIG. 1 in greater detail.

The system 10 for extending JSF web pages to support multiple devices in accordance with an embodiment of the present invention is illustrated in greater detail in FIG. 2. As shown, the server 20 generally includes a processor 100, memory 102, bus 104, input/output (I/O) interfaces 106 and external devices/resources 108. Processor 100 may comprise a single processing unit, or may be distributed across one or more processing units in one or more locations (e.g., over network 110). Memory 102 may comprise any known type of data storage and/or transmission media, including magnetic media, optical media, random access memory (RAM), read-only memory (ROM), etc. Moreover, similar to processor 100, memory 102 may reside at a single physical location, comprising one or more types of data storage, or be distributed across a plurality of physical systems in various forms.

I/O interfaces 106 may comprise any system for exchanging information to/from an external source. External devices/resources 108 may comprise any known type of external device, including speakers, a CRT, LED screen, handheld device, keyboard, mouse, voice recognition system, speech output system, printer, monitor/display (e.g., display 112), facsimile, pager, etc.

Bus 104 provides a communication link between each of the components in the server 20, and likewise may comprise any known type of transmission link, including electrical, optical, wireless, etc. In addition, although not shown, additional components, such as cache memory, communication systems, system software, etc., may be incorporated into the server 20.

JSF tags 22, JSF components 26, JSF-md tags 24, JSF-md components 28, JSF web pages 18, and other data used in the practice of the present invention can be stored locally to server 20, for example, in storage unit 114, and/or may be provided to server 20 over a network (e.g., network 110). Storage unit 114 can be any system capable of providing storage for data and information under the present invention. As such, storage unit 114 may reside at a single physical location, comprising one or more types of data storage, or may be distributed across a plurality of physical systems in various forms. In another embodiment, storage unit 114 may be distributed across, for example, a local area network (LAN), wide area network (WAN) or a storage area network (SAN) (not shown).

Network 110 is intended to represent any type of network over which data can be transmitted. For example, network 110 can include the Internet, a wide area network (WAN), a local area network (LAN), a virtual private network (VPN), a WiFi network, or other type of network. To this extent, communication can occur via a direct hardwired connection or via an addressable connection in a client-server (or server-server) environment that may utilize any combination of wireline and/or wireless transmission methods. In the case of the latter, the server and client may utilize conventional network connectivity, such as Token Ring, Ethernet, WiFi or other conventional communications standards. Where the client communicates with the server via the Internet, connectivity could be provided by conventional TCP/IP sockets-based protocol. In this instance, the client would utilize an Internet service provider to establish connectivity to the server.

A client device 14 is connected to the server 20 over network 110. Although not shown, client device 14 includes many of the same components described above with regard to the server 20. A browser 12 for viewing web pages is provided on the client device 14.

Shown in memory 102 is a request system 118 for receiving a request for a JSF web page 18 from client device 14 and a render kit 30 containing one or more renderers 120 for rendering the requested JSF web page 18 in the markup language text required by client device 14 using the JSF components 26 referenced by the JSF tags 22 in the JSF web page 18 and the JSF-md components 28 referenced by the JSF-md tags 24 in the JSF web page 18. Also shown in memory 108 is a response system 122 for sending the rendered JSF web page 18 to client device 14 for display in browser 12.

It should be appreciated that the teachings of the present invention can be offered as a business method on a subscription or fee basis. For example, system 10 could be created, maintained, supported, and/or deployed by a service provider that offers the functions described herein for customers. That is, a service provider could be used to extend JSF web pages to support multiple devices, as described above.

It should also be understood that the present invention can be realized in hardware, software, a propagated signal, or any combination thereof. Any kind of computer/server system(s)—or other apparatus adapted for carrying out the methods described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized. The present invention can also be embedded in a computer program product or a propagated signal, which comprises all the respective features enabling the implementation of the methods described herein, and which—when loaded in a computer system—is able to carry out these methods. Computer program, propagated signal, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

We claim:

1. A method for extending Java Server Faces (JSF) Web pages to support multiple devices, the method comprising:
storing a JSF Web page in a Web server, the JSF Web page comprising device independent and markup language independent multiple device JSF tags and lacking any markup language specific elements, the device independent and markup language independent multiple device JSF tags referencing a multiple device component representative of a top-level element of the JSF Web page, a multiple device component representative of an area of the JSF Web page, and a multiple device component representative of an arrangement of one or more widgets in the area;
receiving, from a client device, a request for the JSF Web page in the Web server;
processing the JSF Web page to identify the device independent and markup language independent multiple device JSF tags;

locating JSF components specific to a particular device and a particular markup language and individually referenced by corresponding ones of the device independent and markup language independent multiple device JSF tags;

selecting a particular render kit of a plurality of render kits in accordance with a markup language required by a Web browser executing on the client device;

rendering the JSF Web page with the located JSF components utilizing the selected render kit; and, returning the rendered JSF Web page to the client device.

2. A computing system for extending Java Server Faces (JSF) Web pages to support multiple devices, the computing system including a processor executing instructions stored in a non-transitory computer-readable storage medium, the instructions including instructions to:

store a JSF Web page in a Web server, the JSF Web page comprising device independent and markup language independent multiple device JSF tags and lacking any markup language specific elements, the device independent and markup language independent multiple device JSF tags referencing a multiple device component representative of a top-level element of the JSF Web page, a multiple device component representative of an area of the JSF Web page, and a multiple device component representative of an arrangement of one or more widgets in the area;

receive, from a client device, a request for the JSF Web page in the Web server;

process the JSF Web page to identify the device independent and markup language independent multiple device JSF tags;

locate JSF components specific to a particular device and a particular markup language and individually referenced by corresponding ones of the device independent and markup language independent multiple device JSF tags;

select a particular render kit of a plurality of render kits in accordance with a markup language required by a Web browser executing on the client device;

render the JSF Web page with the located JSF components utilizing the selected render kit; and, return the rendered JSF Web page to the client device.

3. A computer program product for extending Java Server Faces (JSF) Web pages to support multiple devices, the computer program product comprising a non-transitory computer-readable storage medium storing computing system-implementable instructions for activities comprising:

storing a JSF Web page in a Web server, the JSF Web page comprising device independent and markup language independent multiple device JSF tags and lacking any markup language specific elements, the device independent and markup language independent multiple device JSF tags referencing a multiple device component representative of a top-level element of the JSF Web page, a multiple device component representative of an area of the JSF Web page, and a multiple device component representative of an arrangement of one or more widgets in the area;

receiving, from a client device, a request for the JSF Web page in the Web server;

processing the JSF Web page to identify the device independent and markup language independent multiple device JSF tags;

locating JSF components specific to a particular device and a particular markup language and individually referenced by corresponding ones of the device independent and markup language independent multiple device JSF tags;

selecting a particular render kit of a plurality of render kits in accordance with a markup language required by a Web browser executing on the client device;

rendering the JSF Web page with the located JSF components utilizing the selected render kit; and, returning the rendered JSF Web page to the client device.

* * * * *